US 6,681,393 B1

(12) United States Patent
Bauminger et al.

(10) Patent No.: US 6,681,393 B1
(45) Date of Patent: Jan. 20, 2004

(54) VIEWER INTERACTION FEEDBACK METHOD AND SYSTEM FOR USE WITH AN INTERACTIVE TELECOMMUNICATION SYSTEM

(75) Inventors: Ilan Bauminger, Jerusalem (IL); Yossef Tsuria, Shoham (IL)

(73) Assignee: NDS Limited, Middlesex (GB)

( * ) Notice: Subject to any disclaimer, the term of this patent is extended or adjusted under 35 U.S.C. 154(b) by 0 days.

(21) Appl. No.: 09/089,717

(22) Filed: Jun. 3, 1998

(30) Foreign Application Priority Data

Jun. 6, 1997 (IL) .............................. 121021
Jan. 29, 1998 (GB) ............................. 9801949

(51) Int. Cl.[7] ........................ H04N 7/16; G06F 17/60
(52) U.S. Cl. ........................... 725/23; 705/14; 463/40
(58) Field of Search .................. 348/1, 7, 10, 460, 348/2, 12; 455/2, 3.1, 6.1; 705/10, 14, 15; 709/217–219; 395/327; 370/260–269; 725/22, 9, 23

(56) References Cited

U.S. PATENT DOCUMENTS

| 4,107,734 A | 8/1978 | Percy et al. .................. 358/84 |
| 4,308,554 A | 12/1981 | Percy et al. .................. 358/84 |
| 4,602,279 A | 7/1986 | Freeman ....................... 358/86 |
| 4,677,466 A | 6/1987 | Lert, Jr. et al. ............... 358/84 |
| 4,745,468 A | 5/1988 | Von Kohorn ................... 358/84 |
| 4,876,592 A | 10/1989 | Von Kohorn ................... 358/84 |
| 4,905,080 A * | 2/1990 | Watanabe et al. ............... 725/14 |
| 4,926,255 A | 5/1990 | Von Kohorn ................... 358/84 |
| 5,034,807 A * | 7/1991 | Von Kohorn ................... 455/2 |
| 5,057,915 A | 10/1991 | Von Kohorn ................... 358/84 |
| 5,128,752 A | 7/1992 | Von Kohorn ................... 358/84 |
| 5,227,874 A * | 7/1993 | Von Kohorn ................... 725/13 |
| 5,249,044 A | 9/1993 | Von Kohorn ................... 358/86 |
| 5,373,440 A * | 12/1994 | Cohen et al. .................. 705/14 |
| 5,412,416 A | 5/1995 | Nemirofsky ................... 348/10 |
| 5,481,294 A | 1/1996 | Thomas et al. ................. 348/1 |
| 5,483,276 A * | 1/1996 | Brooks et al. ................. 725/10 |
| 5,488,423 A | 1/1996 | Walkingshaw et al. ........ 348/460 |
| 5,504,519 A * | 4/1996 | Remillard .................... 348/7 |
| 5,530,469 A | 6/1996 | Garfinkle ..................... 348/1 |
| 5,539,822 A | 7/1996 | Lett .......................... 380/20 |
| 5,550,681 A | 8/1996 | Mazarac ...................... 359/872 |

(List continued on next page.)

FOREIGN PATENT DOCUMENTS

| GB | 2 192 297 A | 1/1988 | ............. G06F/3/00 |
| WO | WO 96/15603 | 5/1996 | ............. H04L/9/00 |
| WO | WO 97/02537 | 1/1997 | ............. G06F/17/60 |
| WO | WO 97/20279 | 6/1997 | ............. G06F/17/60 |

Primary Examiner—Vivek Srivastava
(74) Attorney, Agent, or Firm—Ladas & Parry (57) ABSTRACT

A viewer response method for use with an interactive telecommunications system. The viewer response method includes accumulating a user interaction history of a user of the system, the user interaction history including user interaction information associated with a plurality of user interaction events and providing user-sensible feedback, based at least in part on the user interaction history.

18 Claims, 5 Drawing Sheets

U.S. PATENT DOCUMENTS

| | | | |
|---|---|---|---|
| 5,555,308 A | 9/1996 | Levien | 380/20 |
| 5,566,353 A | 10/1996 | Cho et al. | 455/2 |
| 5,585,858 A | 12/1996 | Harper et al. | 348/485 |
| 5,619,250 A | 4/1997 | McClellan et al. | 348/10 |
| 5,635,978 A | 6/1997 | Alten et al. | 348/7 |
| 5,640,192 A | 6/1997 | Garfinkle | 348/1 |
| 5,666,645 A | 9/1997 | Thomas et al. | 455/6.1 |
| 5,737,527 A | 4/1998 | Shiels et al. | 395/200 |
| 5,759,101 A | 6/1998 | Von Kohorn | 463/40 |
| 5,760,821 A | 6/1998 | Ellis et al. | 348/10 |
| 5,761,601 A | 6/1998 | Nemirofsky et al. | 455/3.1 |
| 5,761,648 A | 6/1998 | Golden et al. | 705/14 |
| 5,946,664 A * | 8/1999 | Ebisawa | 705/14 |
| 5,970,469 A | 10/1999 | Scroggie et al. | 705/14 |
| 5,978,013 A | 11/1999 | Jones et al. | 348/10 |
| 6,057,872 A | 5/2000 | Candelore | 348/3 |
| 6,064,978 A * | 5/2000 | Gardner et al. | 705/10 |
| 6,070,145 A * | 5/2000 | Pinsley et al. | 705/10 |
| 6,075,971 A | 6/2000 | Williams et al. | 455/5.1 |

\* cited by examiner

VIEWER INTERACTION FEEDBACK METHOD AND SYSTEM FOR USE WITH AN INTERACTIVE TELECOMMUNICATION SYSTEM

FIELD OF THE INVENTION

The present invention relates to communication systems in general, and in particular to communication systems for measuring user interaction or response, such as television systems for measuring viewer response.

BACKGROUND OF THE INVENTION

Communications systems which measure viewer response are well-known in the art. An example of such a system is described in U.S. Pat. 4,107,734 and 4,308,554 to Percy et al. Other related technologies are described, for example, in U.S. Pat. 5,481.294 to Thomas et al. and 4,677,466 to Lert, Jr. et al.

A system which provides, in an interactive communications system, interactive information output based on a selection profile is described in U.S. Pat. 4,602,279 to Freeman.

The disclosures of all references mentioned above and throughout the present specification are hereby incorporated herein by reference.

SUMMARY OF THE INVENTION

The present invention seeks to provide an improved communication system for measuring user response.

There is thus provided in accordance with a preferred embodiment of the present invention a viewer response method for use with an interactive telecommunications system, the method including accumulating a user interaction history of a user of the system, the user interaction history including user interaction information associated with a plurality of user interaction events, and providing user-sensible feedback, based at least in part on the user interaction history.

Further in accordance with a preferred embodiment of the present invention the step of providing user-sensible feedback includes providing user-sensible feedback via the telecommunications system.

Additionally in accordance with a preferred embodiment of the present invention the plurality of user interaction events comprises a customized plurality of user interaction events customized to the user.

Still further in accordance with a preferred embodiment of the present invention the interactive telecommunications system includes a television system, and the user interaction history includes a viewing history including viewing information associated with a plurality of viewing events.

Additionally in accordance with a preferred embodiment of the present invention at least one of the plurality of viewing events includes the user viewing a commercial.

Moreover in accordance with a preferred embodiment of the present invention the commercial includes a selected commercial selected from a plurality of commercials broadcast via the television system.

Further in accordance with a preferred embodiment of the present invention the plurality of viewing events includes the viewer viewing at least two commercials, and the at least two commercials include at least two commercials selected, according to at least one predetermined criterion, from a plurality of commercials broadcast via the interactive television system.

Still further in accordance with a preferred embodiment of the present invention the interactive telecommunications system includes a computer network based communications system.

Additionally in accordance with a preferred embodiment of the present invention the computer network based communications system includes a World Wide Web (WWW) based system.

Moreover in accordance with a preferred embodiment of the present invention the user interaction information includes information supplied by the user while participating in at least one of the plurality of user interaction events.

Further in accordance with a preferred embodiment of the present invention the step of accumulating a user interaction history of a user includes performing the following steps at least twice: prompting the user to enter a response during a user interaction event, receiving the response entered by the user, and storing the response.

Still further in accordance with a preferred embodiment of the present invention the step of providing user-sensible feedback includes providing an indication that the user is entitled to receive a prize.

Additionally in accordance with a preferred embodiment of the present invention the step of providing user-sensible feedback includes providing an indication that the user is entitled to participate in a game.

Moreover in accordance with a preferred embodiment of the present invention the indication that the user is entitled to participate in the game includes an indication that a winner of the game is entitled to receive a prize.

There is also provided in accordance with another preferred embodiment of the present invention a method for playing a game using an interactive television system, the method including accumulating a viewing history of a viewer, the viewing history including viewing information associated with a plurality of viewing events, and authorizing the viewer to participate in a game based, at least in part, on the viewing history.

Further in accordance with a preferred embodiment of the present invention the method also includes the step of providing the game to the user via the interactive television system.

Still further in accordance with a preferred embodiment of the present invention at least one of the plurality of viewing events includes the viewer viewing a commercial.

Additionally in accordance with a preferred embodiment of the present invention the commercial includes a selected commercial selected from a plurality of commercials broadcast via the interactive television system.

Moreover in accordance with a preferred embodiment of the present invention the plurality of view events includes the viewer viewing at least two commercials, and the at least two commercials include at least two commercials selected, according to a predetermined criterion, from a plurality of commercials broadcast via the interactive television system.

Further in accordance with a preferred embodiment of the present invention the interactive television system includes a headend located at a site remote from the viewer, and the method also includes transmitting a message including at least a portion of the viewing history to the headend.

Still further in accordance with a preferred embodiment of the present invention the method also includes analyzing the portion of the viewing history at the headend, and modifying the behavior of the interactive television system based, at least in part, on a result of the analyzing step.

There is also provided in accordance with another preferred embodiment of the present invention an interactive viewer-response telecommunications system including user interaction history apparatus for accumulating a user interaction history of a user of the system, the user interaction history including user interaction information associated with a plurality of user interaction events, and user-sensible feedback apparatus for providing user-sensible feedback, based at least in part on the user interaction history.

There is also provided in accordance with another preferred embodiment of the present invention an interactive television system including viewing history apparatus for accumulating a viewing history of a viewer, the viewing history including viewing information associated with a plurality of viewing events, and gaming authorization apparatus for authorizing the viewer to participate in a game based, at least in part, on the viewing history.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1A:
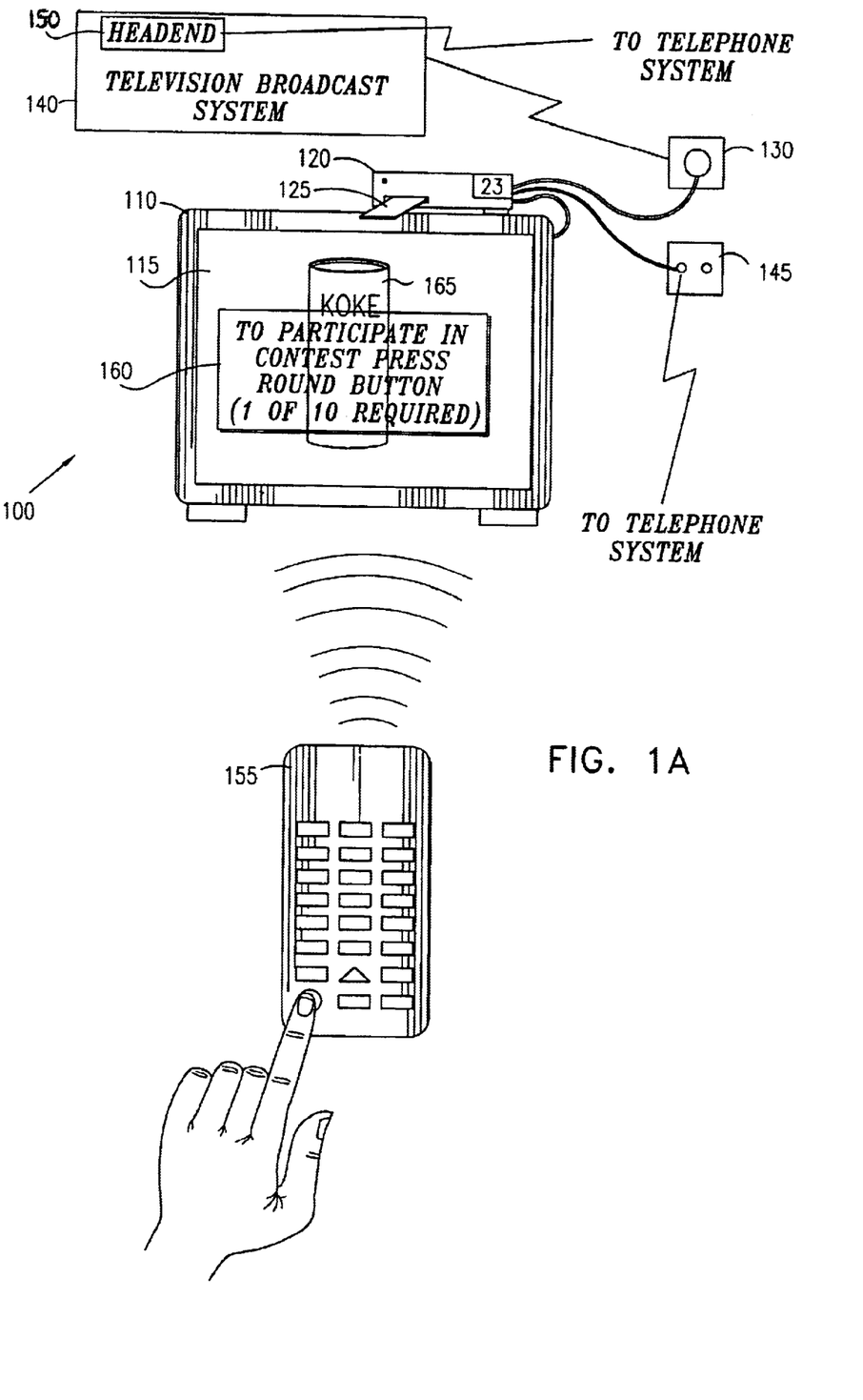
FIG. 1A is a simplified partly pictorial, partly block-diagram illustration of a communication system for measuring user response constructed and operative in accordance with a preferred embodiment of the present invention.

Reference is now made to FIG. 1A which is a simplified partly pictorial, partly block-diagram illustration of a communication system for measuring user response constructed and operative in accordance with a preferred embodiment of the present invention. The system of FIG. 1A comprises a communication system, specifically a television system designated generally 100. It is appreciated that the television system 100 is shown in FIG. 1A by way of example only, and that, in general, any appropriate communication system may be used such as, for example, a network-based computer systems such as, for example, an Internet-based system accessing the World Wide Web (WWW).

The terms "user" and "viewer" are used interchangeably throughout the present specification and claims to refer to any person who uses or views a communication system such as, for example, a viewer of the television system 100 or a user of an Internet-based system accessing the World Wide Web.

The system of FIG. 1A preferably comprises a television receiver 110, which may be any appropriate television receiver equipped with a display screen 115. The television receiver 110 is preferably operatively attached, typically with appropriate cabling, to a set top box 120. Typically, the set top box 120 comprises an associated removable security element 125, such as a smart card. In a case where broadcasts to the set top box 120 are encrypted, the removable security element 125 is typically responsible for providing access services necessary to allow decryption of the broadcasts, as is well known in the art.

The set top box 120 is in turn preferably operatively attached, also typically with appropriate cabling, to a connector 130, which may comprise any appropriate connector operatively associated with a television broadcast system 140.

The television broadcast system 140 typically comprises a cable television system or a satellite television system, but another appropriate type of television broadcast system may be used. As is well-known in the art, the set top box 120 is preferably chosen for compatibility with the particular television broadcast system 140, although it is appreciated that a set top box 120 which is compatible with a variety of television broadcast systems may be used.

Typically, the set top box 120 is operative to receive broadcast transmissions from the television broadcast system 140 through the connector 130, and to pass the broadcast transmissions on to the television 110. Preferably, the set top box 120 is also operative to send and/or receive information through a telephone connector 145 and thence via a telephone system (not shown), such as the public switched telephone network, typically communicating with a headend 150 comprised in the television broadcast system 140. The headend 150 is typically operative, as is well known in the art, to control broadcasts over the television broadcast system 140.

The system of FIG. 1A also preferably comprises a remote control unit 155, which may comprise any suitable remote control unit capable of remotely controlling the set top box 120 and/or the television receiver 110. Preferably, the remote control unit 155 controls the set top box 120, which in turn controls the television receiver 110, as is well known in the art.

In FIG. 1A an overlay 160 is shown overlaying a broadcast picture 165 on the display screen 115. The term "overlay", as used throughout the present specification and claims, may refer to any appropriate type of display message which is added to the broadcast picture such as, for example: a full screen overlay; a partial screen overlay; an opaque overlay; a transparent overlay; or any other. appropriate overlay. As is well known in the art, an overlay such as the overlay 160 is typically produced by the set top box 120, typically in response to a command received from the headend 150.

The operation of the apparatus of FIG. 1A is now briefly described. The overlay 160 preferably comprises a message inviting a viewer of the television receiver 110 to indicate willingness to participate in a contest. The terms "contest" and "game" are used interchangeably throughout the present specification and claims to refer to any game, contest, or other participatory event. While typically a contest, in the context of the present specification, refers to a contest which may be played via a television system or other communication system, a contest may also refer to any other appropriate kind of contest or game, such as, for example: a game which is sent to the viewer via the mail; a contest at a site to which admission is restricted; or any other appropriate contest or game, especially a contest or game in which participation is restricted to invited participants.

Alternatively, the user of the system of FIG. 1A may be provided with a prize without participating in a contest; may be provided with free or reduced cost access to pay television services carried by the television broadcast system 140;

may be provided with a congratulatory message; may be provided with an opportunity to donate money to charity; or may be provided with any other appropriate feedback. The term "prize", as used throughout the present specification and claims, may, in addition to other appropriate types of prize, include a coupon representing availability of a good or service at a reduced price or at no cost.

Typically, as shown in FIG. 1A, the viewer indicates willingness to participate by pressing a particular button on the remote control 155, which then transmits an indication of the button having been pressed to the set top box 120, as is well known in the art. It is appreciated, however, that other methods of indicating willingness to participate may alternatively be used such as, for example: speaking a response which is received by a voice recognition system (not shown), such as, for example, a voice recognition system comprised in the set top box 120; entering a code, such as a code provided upon purchase of a particular product; answering a question, such as a multiple choice question; or placing a telephone call to a particular telephone number.

Typically, the message may be provided along with an associated advertisement. Reference is now additionally made to FIGS. 1B–1D, which are simplified partly pictorial, partly block-diagram illustrations of the system of FIG. 1A, useful in understanding the operation thereof. Typically, in order to be allowed to participate in a contest, the user of the system of FIG. 1A will be required to indicate willingness to participate during the broadcast of a plurality of programs, typically a predetermined number of programs, which number may be determined by the headend 150 and communicated to the set top box 120.

Typically, the plurality of programs comprises a plurality of advertisements. It is believed that the present invention is particularly useful when the user is required to indicate willingness to participate during a plurality of related advertisements, such as advertisements for a single product, so that the user being allowed to participate may be seen as a reward for viewing the plurality of related advertisements.

Figure 1B:
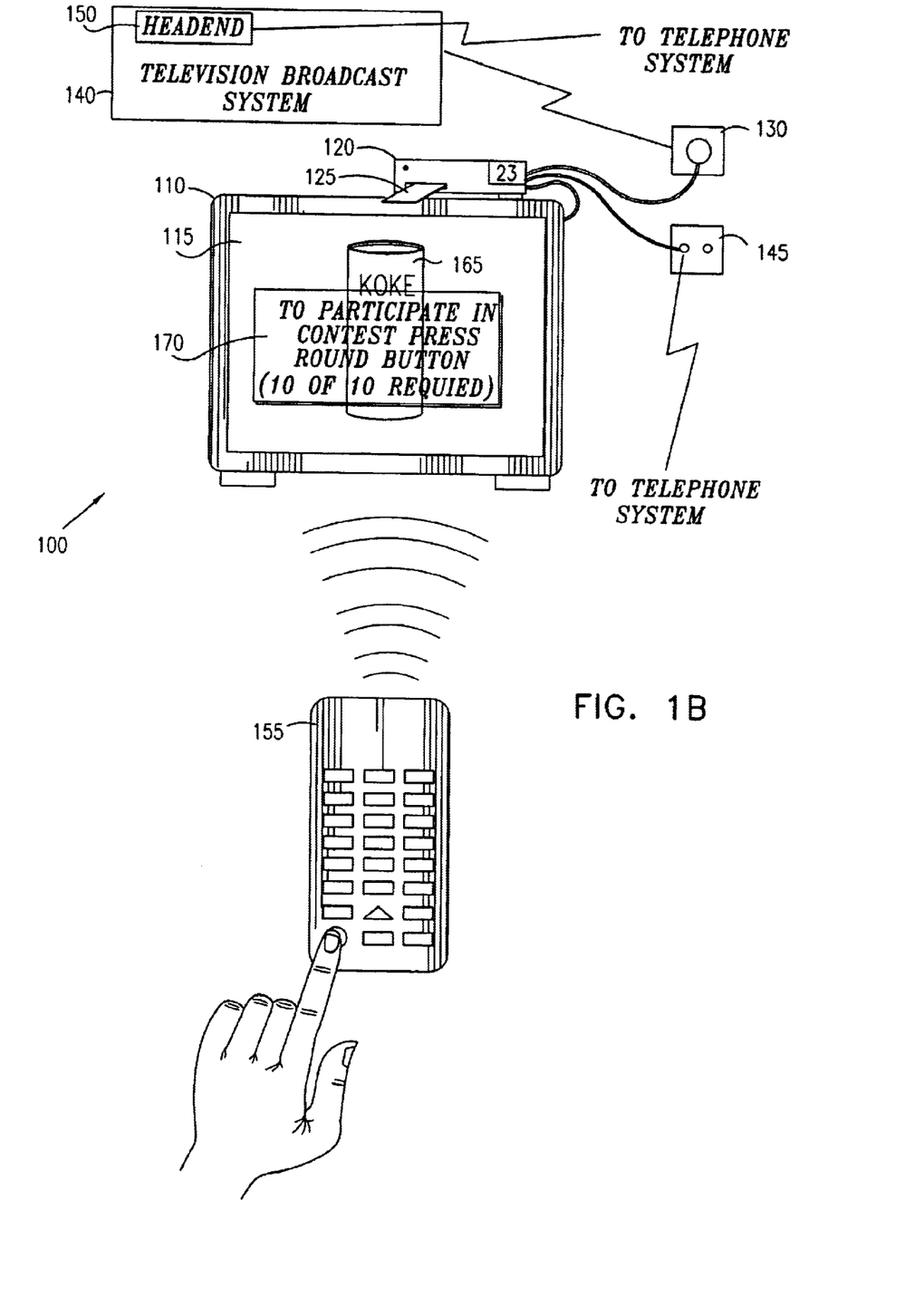
FIGS. 1B–1D are simplified partly pictorial, partly block-diagram illustrations of the system of FIG. 1A, useful in understanding the operation thereof.

In FIG. 1A, a viewer indicates willingness to participate in a contest, the willingness being indicated during broadcast of a commercial. As indicated by the overlay 160, this is the first time that the viewer has indicated willingness to participate, and the viewer must indicate willingness a plurality of times, typically during a plurality of related commercials, in order to be allowed to participate:

In FIG. 1B, the viewer is shown indicating willingness to participate in the contest again. As indicated by a second overlay 170, the viewer has already indicated willingness to participate a plurality of times, and the instance shown in FIG. 1B is the final indication necessary to allow participation.

Preferably, information comprising an indication of the viewer's willingness to participate is transmitted by the set top box 120 to the headend 150, through the telephone connector 145, via the telephone system. The transmission of such information may take place after each indication of willingness to participate, after the plurality of indications of willingness to participate, or at another time. The information may preferably be used by the headend 150 to alter the behavior of the set top box 120 and the television receiver 110 by displaying special overlays, allowing participation in interactive television games, or in another appropriate manner.

Figure 1C:
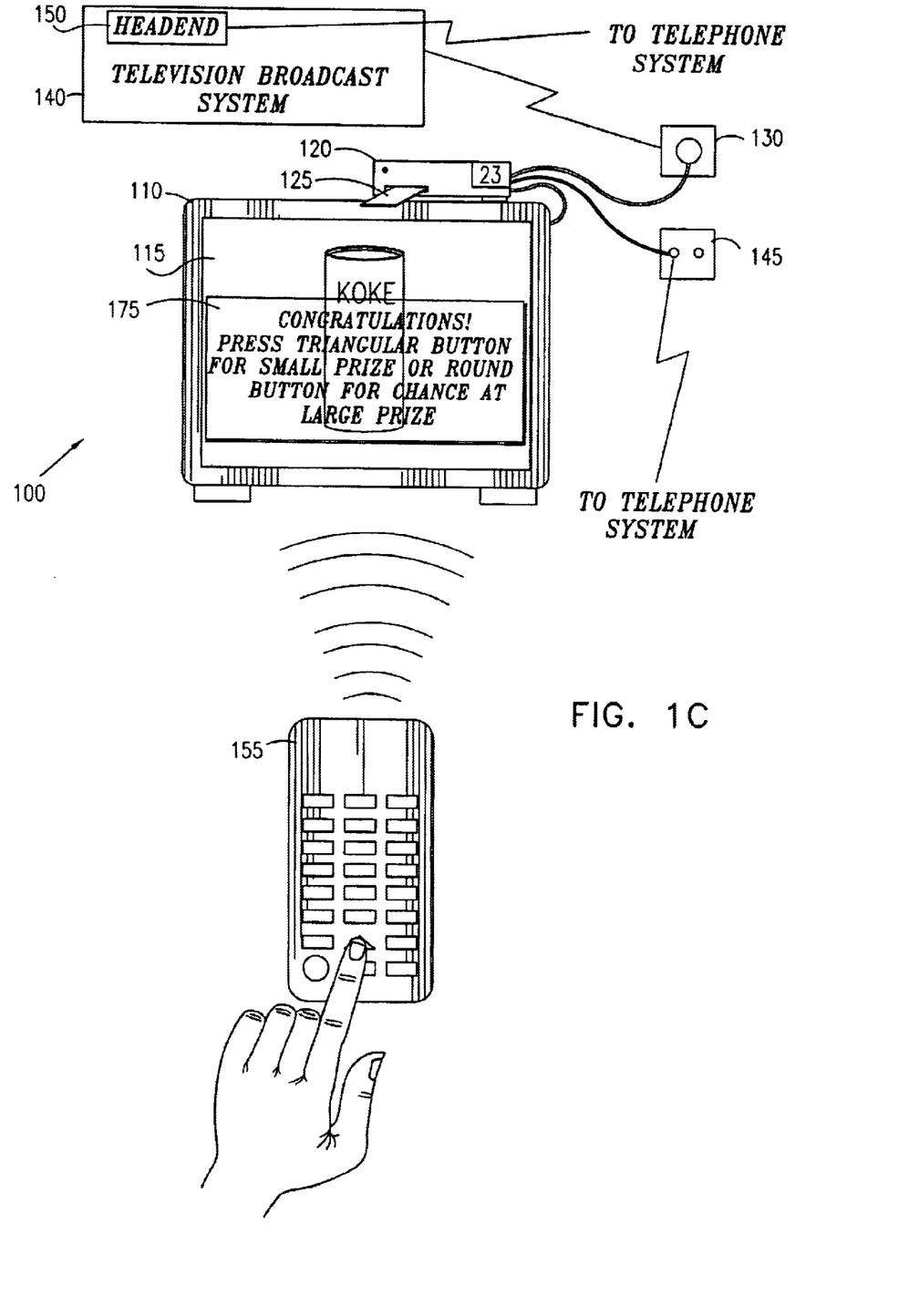

In FIG. 1C the viewer is shown requesting to participate in a contest in response to a contest invitation overlay 175, which is preferably displayed by the set top box 120 after the plurality of indications of willingness to participate, typically based on instructions received from the headend 150. The participation request may comprise an additional input, similar to the input described above with reference to FIG. 1A, such as an input of a code, such as a code provided upon purchase of a particular product. Said instructions may be transmitted at an earlier time by the headend 150 and stored in the set top box 120 or in the associated removable security element 125.

Figure 1D:
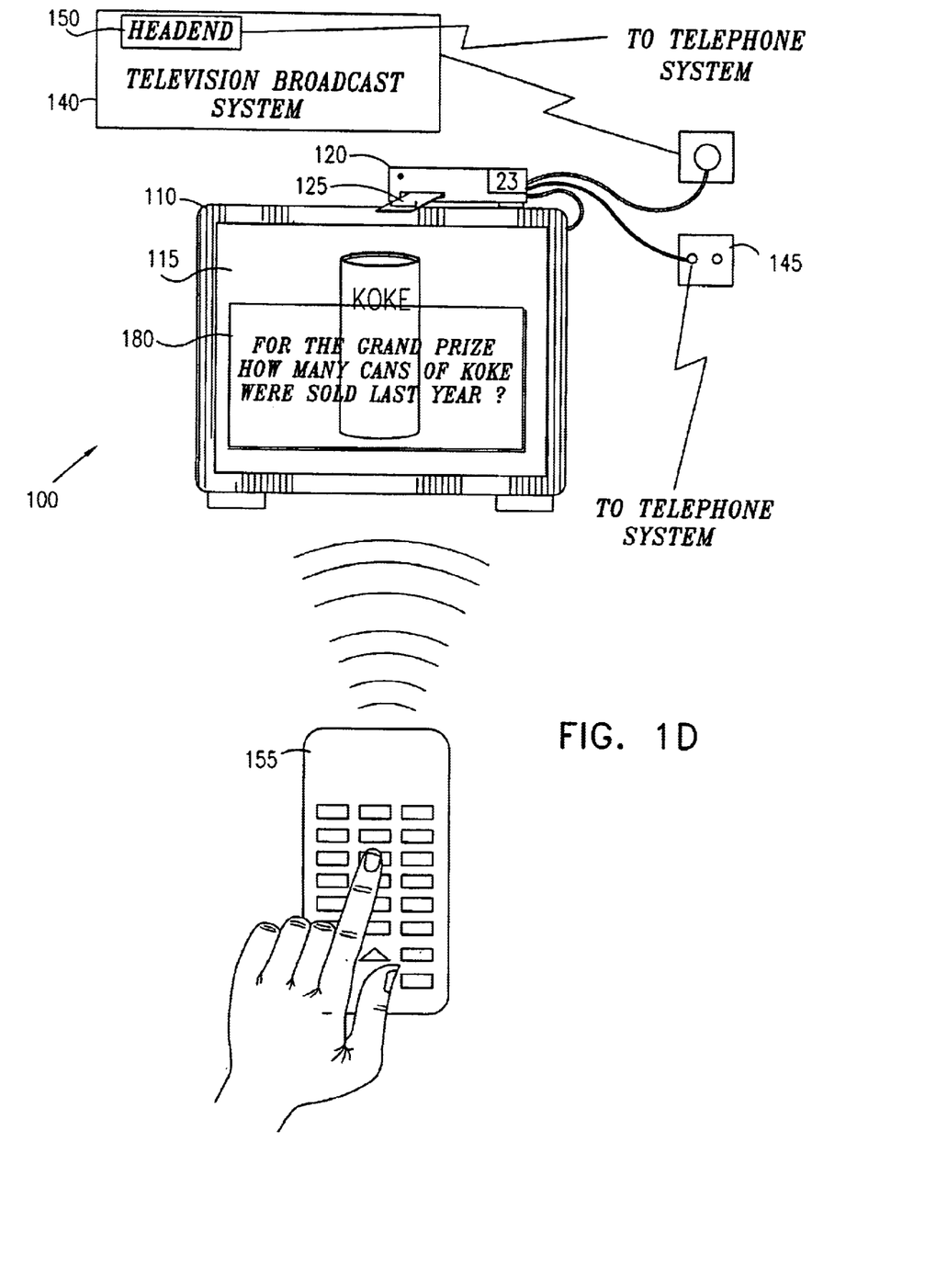

In FIG. 1D the viewer participates in a contest in response to a contest overlay 180, which is typically produced similarly to the contest invitation overlay 175. As described above, it is appreciated that an interactive contest played via the system of FIGS. 1A–1D is only one possible type of contest, and any appropriate type of contest may be made available to the viewer.

It is appreciated that, in a case where the viewer is asked to answer a question, as described above, the viewer may typically be asked to answer a question based on information provided during one or more previous programs or advertisements from among the plurality of programs or advertisements.

It is further appreciated that, using methods well known in the art of pay television conditional access systems, different overlays such as, for example, different overlays 160 and 165, may be presented to different viewers at different locations. Alternatively or additionally, the advertisement or program itself may be customized to the viewer using similar methods, as is well known in the art. In this way, a customized contest may be provided to viewers.

Figure 2:
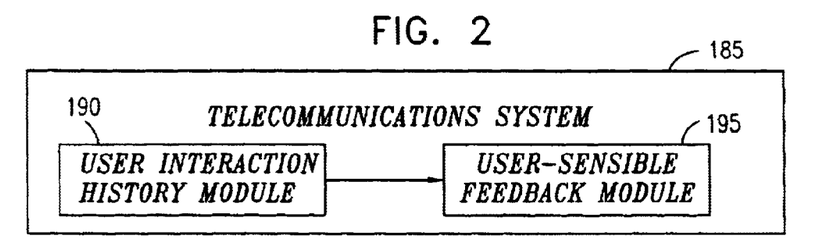
FIG. 2 is a simplified block diagram illustration of a portion of the system of FIG. 1A.

Reference is now made to FIG. 2 which is a simplified block diagram illustration of a portion of the system of FIG. 1A. The apparatus of FIG. 2 comprises a telecommunications system 185, which may, as described above, comprise the television system 100 or any other appropriate telecommunications system. The telecommunications system 185 comprises, in addition to conventional telecommunications system components (not shown) a user interaction history module 190 and a user-sensible feedback module 195.

Typically, the user interaction history module 190 and the user-sensible feedback module 195 may be implemented in software on an appropriate conventional computer, and may be located in the headend 150 of FIG. 1A, the set top box 120 of FIG. 1A, or elsewhere. Preferably, the user interaction history module 190 is operative to accumulate a history of interactions of a user with the system of FIG. 1A and to provide user interaction history information typically comprising the history of interactions to the user-sensible feedback module 195. The user-sensible feedback module 195 is operative to provide feedback to the user in some way that the user can sense, such as by picture, by voice, by sending an electronic mail message, by sending a paper mail message, or otherwise. As described above, typically said feedback comprises an offer to participate in a contest.

Figure 3:
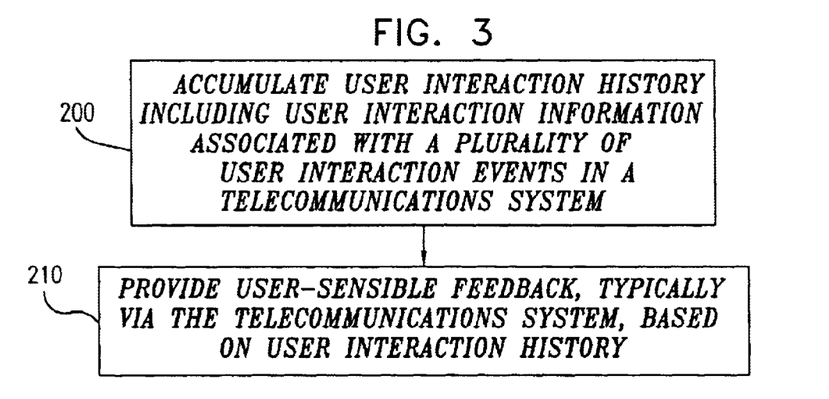
FIG. 3 is a simplified flowchart illustration of a preferred method of operation of the system of FIG. 1A.

Reference is now made to FIG. 3 which is a simplified flowchart illustration of a preferred method of operation of the system of FIG. 1A. The method of FIG. 3 preferably comprises the following steps:

User interaction history is accumulated, typically for a particular user of the system of FIG. 1A (step 200). The user interaction history typically is associated with a plurality of events in a telecommunications system such as that of FIG. 1A.

User-sensible feedback is provided to the user (step 210). Typically, the feedback is provided via the telecommunications system and is based on the user interaction history accumulated in step 200.

Figure 4:
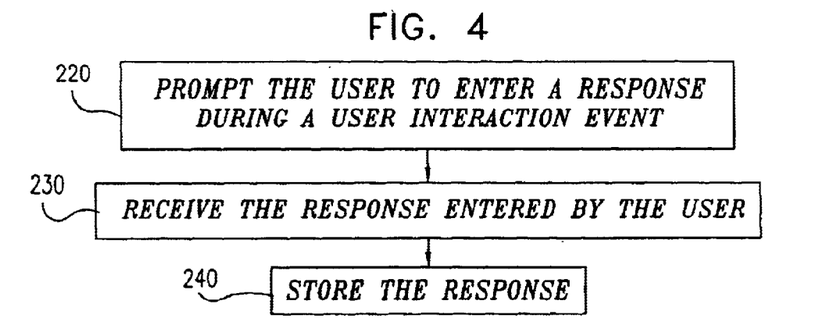
FIG. 4 is a simplified flowchart illustration of a preferred implementation of step 200 of FIG. 3.

Reference is now made to FIG. 4 which is a simplified flowchart illustration of a preferred implementation of step 200 of FIG. 3. The method of FIG. 4 preferably includes the following steps:

The user is prompted to enter a response during a user interaction event (step 220). The response entered by the user is received (step 230) and stored (step 240).

Figure 5:
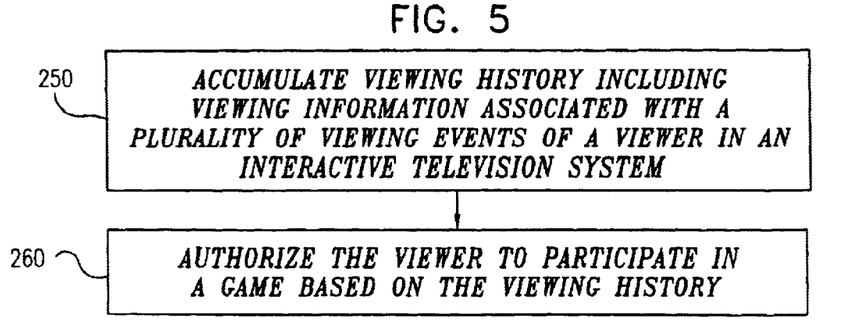
FIG. 5 is a simplified flowchart illustration of an alternative preferred method of operation of the system of FIG. 1A.

Reference is now made to FIG. 5 which is a simplified flowchart illustration of an alternative preferred method of operation of the system of FIG. 1A. The method of FIG. 5 preferably includes the following steps:

Viewing history is accumulated, typically for a particular viewer of the system of an interactive television system such as the system of FIG. 1A (step 250). The viewing history typically includes viewing information associated with a plurality of viewing events of the viewer of the interactive television system.

Based on the viewing history accumulated in step 250, the viewer is provided with an award; for example, the viewer may be authorized to participate in a game (step 260).

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only the by claims which follow:

What is claimed is:

1. A viewer feedback system for use in a broadcasting system, the viewer feedback system comprising:

a receiver for receiving a plurality of advertisements broadcast to a viewer, each of the plurality of advertisements being overlaid with an invitation to participate in a contest, wherein the invitation may be responded to by the viewer during viewing of the advertisement;

a user interaction history builder for receiving a plurality of viewer invitation responses, each said response comprising a response to one of said plurality of overlaid invitations; and a feedback rewarder for entering the viewer in the contest upon receipt of at least a predetermined minimum plurality of said viewer invitation responses by the user interaction history builder.

2. A viewer feedback system according to claim 1 and also comprising:

a broadcaster for broadcasting the plurality of advertisements.

3. A viewer feedback system according to claim 1 and wherein all of the plurality of advertisements comprise advertisements for a single product.

4. A viewer feedback system according to claim 1 and wherein said receiver receives the plurality of advertisements via a television broadcasting system.

5. A viewer feedback system according to claim 4 and wherein the television broadcasting system comprises at least one of the following:

a cable television system; and a satellite television system.

6. A viewer feedback system according to claim 1 and wherein said receiver receives the plurality of advertisements via the Internet.

7. A viewer feedback system according to claim 1 and also comprising a set top box, the set top box comprising:

the receiver;

the user interaction history builder; and the feedback rewarder.

8. A viewer feedback system according to claim 1 and wherein the plurality of advertisements are encrypted, and also comprising:

a decrypter for decrypting the plurality of advertisements.

9. A viewer feedback system according to claim 1 and also comprising:

a remote control unit for receiving said plurality of viewer invitation responses from the viewer and sending the viewer invitation responses to the user interaction history builder.

10. A viewer feedback system for use in a broadcasting system, the viewer feedback system comprising:

a receiver for receiving a plurality of related advertisements broadcast to a viewer, each of the plurality of related advertisements being overlaid with one of a plurality of overlaid invitations to a viewer to provide a feedback indication during broadcast of the advertisement, wherein overlaid invitations are invitations to participate in a contest;

a user interaction history builder for receiving a plurality of viewer feedback indications, each said user feedback indication comprising a feedback indication associated with one of said plurality of overlaid invitations overlaid over one of said plurality of related advertisements; and a feedback rewarder for entering viewer into said contest upon receipt of at least a predetermined minimum plurality of said feedback indications by the user interaction history builder, wherein all of the plurality of advertisements comprise advertisements for a single product.

11. A viewer feedback system according to claim 10 and also comprising:

a broadcaster for broadcasting the plurality of related advertisements.

12. A viewer feedback system according to claim 10 and wherein said receiver receives the plurality of advertisements via a television broadcasting system.

13. A viewer feedback system according to claim 12 and wherein the television broadcasting system comprises at least one of the following:

a cable television system; and a satellite television system.

14. A viewer feedback system according to claim 10 and wherein said receiver receives the plurality of advertisements via the Internet.

15. A viewer feedback system according to claim 10 and also comprising a set top box, the set top box comprising:

the receiver;

the user interaction history builder; and the feedback rewarder.

16. A viewer feedback system according to claim 10 and wherein the plurality of advertisements are encrypted, and also comprising:

a decrypter for decrypting the plurality of advertisements.

17. A viewer feedback system according to claim 10 and also comprising:

a remote control unit for receiving said plurality of viewer feedback indications from the viewer and sending the viewer feedback indications to the user interaction history builder.

18. A viewer feedback system for use in a broadcasting system, the viewer feedback system comprising:
- a television broadcaster for broadcasting a plurality of related encrypted advertisements via a television broadcasting system, all of the plurality of related advertisements comprising advertisements for a single product, the television broadcasting system comprising at least one of the following:
  - a cable television system; and
  - a satellite television system;
- a set top box comprising:
  - a receiver for receiving the plurality of related advertisements broadcast to a viewer, each of the plurality of related advertisements being overlaid with one of a plurality of overlaid invitations to a viewer to provide a feedback indication during broadcast of the advertisement;
  - a decrypter for decrypting the plurality of encrypted advertisements;
  - a user interaction history builder for receiving a plurality of viewer feedback indications, each said user feedback indication comprising a feedback indication associated with one of said plurality of overlaid invitations overlaid over one of said plurality of related advertisements; and
  - a feedback rewarder for providing a benefit to the viewer upon receipt of at least a predetermined minimum plurality of said feedback indications by the user interaction history builder; and
- a remote control unit for receiving said plurality of viewer feedback indications from the viewer and sending the viewer feedback indications to the user interaction history builder.

* * * * *